US009759474B2

(12) United States Patent
Hiltscher et al.

(10) Patent No.: US 9,759,474 B2
(45) Date of Patent: Sep. 12, 2017

(54) HYGIENIC COOLING CHANNEL (71) Applicant: Hosokawa Bepex GmbH, Leingarten (DE)

(72) Inventors: Markus Hiltscher, Hamburg (DE); Heiko Groetsch, Hamburg (DE); Mike Beckert, Leingarten (DE); Marc Horna, Ilsfelder (DE)

(73) Assignee: HOSOKAWA BEPEX GMBH, Leingarten (DE)

( * ) Notice: Subject to any disclaimer, the term of this patent is extended or adjusted under 35 U.S.C. 154(b) by 425 days.

(21) Appl. No.: 14/366,224

(22) PCT Filed: Dec. 21, 2012

(86) PCT No.: PCT/EP2012/076711
§ 371 (c)(1),
(2) Date: Jun. 17, 2014

(87) PCT Pub. No.: WO2013/093032
PCT Pub. Date: Jun. 27, 2013

(65) Prior Publication Data
US 2015/0040600 A1    Feb. 12, 2015

(30) Foreign Application Priority Data
Dec. 22, 2011    (DE) .................. 10 2011 122 062

(51) Int. Cl.
F25D 25/04    (2006.01)
F25D 13/06    (2006.01)
A23G 7/02    (2006.01)

(52) U.S. Cl.
CPC ............. *F25D 13/067* (2013.01); *A23G 7/02* (2013.01); *F25D 2317/0417* (2013.01);
(Continued)

(58) Field of Classification Search
CPC ...... A23G 7/0093; A23G 7/02; F25D 13/067; F25D 2317/04; F25D 2317/06;
(Continued)

(56) References Cited

U.S. PATENT DOCUMENTS 3,935,321 A    1/1976    Sakler et al.
4,319,460 A *  3/1982    Williams ............... A23B 4/066
                                                      62/121

(Continued)

FOREIGN PATENT DOCUMENTS

DE        212414 A1      8/1984
DE    10119077 C1      11/2002
(Continued)

OTHER PUBLICATIONS

PCT Publication and International Search Report of International Application No. PCT/EP2012/076711 (WO 2013/093032 A1); published Jun. 27, 2013; 31 pages.

(Continued)

*Primary Examiner* — Len Tran
*Assistant Examiner* — Ana Vazquez
(74) *Attorney, Agent, or Firm* — Moore & Van Allen PLLC; Henry B. Ward, III (57) ABSTRACT A cooling channel is provided for cooling goods to be chilled, in particular food or pharmaceutical products. The cooling channel includes a cooling tower having an inlet end and an outlet end; a driven conveyor belt on which the goods to be chilled are arranged such that they can be conveyed through the cooling tower from the inlet end to the outlet end; a housing surrounding the conveyor belt and forming a cooling zone in the region of the conveyor belt; a filter unit for filtering air; a cooling unit for cooling the cooling zone;

(Continued)

and at least one fan that interacts thermodynamically with the cooling unit and that conveys cooled air from the cooling unit to the cooling zone.

13 Claims, 6 Drawing Sheets

(52) U.S. Cl.
CPC ...... *F25D 2317/06* (2013.01); *F25D 2323/02* (2013.01); *F25D 2327/00* (2013.01)

(58) Field of Classification Search
CPC ............. F25D 17/042; F25D 2323/022; F25D 2327/00; F25D 2317/0417
USPC .............................. 62/380, 63, 264, 426, 266
See application file for complete search history.

(56) References Cited

U.S. PATENT DOCUMENTS

| | | | |
|---|---|---|---|
| 4,669,278 A | | 6/1987 | Lee, Jr. et al. |
| 5,970,730 A | * | 10/1999 | Koch ........................ A23G 7/02 62/186 |
| 6,065,531 A | * | 5/2000 | Schneider ............. F24F 13/222 165/122 |
| 2003/0041614 A1 | * | 3/2003 | Burn ........................ F25D 25/04 62/380 |
| 2008/0253088 A1 | * | 10/2008 | Tracy ...................... G06F 1/203 361/695 |
| 2010/0199703 A1 | * | 8/2010 | Ziegler ................... A23L 3/361 62/380 |

FOREIGN PATENT DOCUMENTS

| | | |
|---|---|---|
| DE | 10353046 A1 | 6/2005 |
| DE | 202005012336 U1 | 9/2005 |
| DE | 20 2006 015 233 U1 * | 2/2007 |
| DE | 202006015233 U1 | 2/2007 |
| EP | 1046343 A1 | 10/2000 |
| EP | 1129625 A2 | 9/2001 |
| EP | 1277409 A2 | 1/2003 |
| EP | 1612495 A1 | 1/2006 |
| EP | 2273217 A2 | 1/2011 |
| GB | 393105 A | 6/1933 |
| JP | H09108105 A | 4/1997 |
| JP | 2010210109 A | 9/2010 |
| WO | WO 2009/151191 A | 12/2009 |

OTHER PUBLICATIONS

English Translation of International Search Report of International Application No. PCT/EP2012/076711 (WO 2013/093032 A1); mail date of Mar. 19, 2013; 2 pages.

* cited by examiner

HYGIENIC COOLING CHANNEL

The present invention relates to a cooling channel for cooling goods to be chilled, in particular food or pharmaceutical products.

In the manufacture of food or pharmaceutical products, particularly in the manufacture of confectionery products, it is often necessary to bring a heated-up food mixture into a predetermined shape, i.e. to prepare it, and then to cool this mixture over a prolonged period. For this purpose, use is made of cooling channels by means of which the prepared food mixture is conveyed through a cooling zone and, in the process, cooled on its path of conveyance. Under these circumstances, it is possible to specifically match the cooling operation to the product which is being processed, both as regards temperature and as regards the cooling period. It is also possible to set other parameters such as, for instance, the humidity, air flow and the like.

Cooling channels for cooling, in particular, confectionery products, are known from the prior art. The reader is referred to Documents EP 1 129 625 B1, EP 1 046 343 B1, EP 1 277 409 B1 and DE 101 19 077 C1. Although various optimising measures have been adopted in this prior art as regards the conveyance or to the setting of the cooling parameters in the particular cooling zone, it has turned out that the cooling channels are vulnerable, particularly from the viewpoint of almost germ-free manufacture of food products or pharmaceutical products. Germs which impair the manufacture of appropriate products can form directly in the region of the cooling unit and of the fan. In particular, it has proved to be difficult to keep the air in-feed, filtering, cooling and conveying regions almost germ-free in a sustained manner.

Another cooling channel is known from Document JP 09-108105 A. However, this cooling channel is subject to the problem that, because of the arrangement, considerable contamination of the interior space of the cooling zone can occur, which results in the formation of germs. In addition, this arrangement is difficult to clean.

The object of the invention is to make available a cooling channel of the kind initially described, which takes these problems into account and by means of which almost germ-free cooling of the goods to be chilled is possible in a sustained manner over a long period.

This object is achieved by means of a cooling channel for cooling goods to be chilled, in particular food or pharmaceutical products, wherein the said cooling channel is designed with a cooling tower which comprises the following features:
- an inlet end and an outlet end;
- a driven conveyor belt, on which the goods to be chilled are arranged and can be conveyed through the cooling channel from the inlet end to the outlet end;
- a housing, which surrounds the conveyor belt and forms a cooling zone in the region of said conveyor belt;
- a filter unit for filtering air;
- a cooling unit for cooling the cooling zone; and
- at least one fan, which interacts thermodynamically with the cooling unit and which is designed to convey cooled air from the cooling unit to the cooling zone;

wherein the cooling unit and the fan are arranged in a housing region which is separate from the cooling zone and sealed off from said cooling zone, wherein only a fluid connection is provided for conveying the cooled air between the fan and the cooling zone, and wherein the filter unit is arranged in front of the cooling unit with respect to the air flow in order to feed only filtered air to said cooling unit.

In the context of the invention, it has been recognised that the problems that have been brought about in the prior art as regards the ingress of contaminants and germs into the cooling zone and that result from this, particularly because of the fluidic and thermodynamic interaction with the surrounding atmosphere, cannot be satisfactorily solved by conventional techniques. The invention therefore follows a different course and ensures that those components of the cooling channel which are particularly susceptible to the occurrence of contaminants and germs are accommodated in a separate housing region which is designed so as to be physically separate from the cooling zone and sealed off therefrom, wherein only a fluid connection is provided for conveying the cleaned, almost germ-free cooled air between the said housing region and the cooling zone.

The invention also provides for the fact that the process air is fed to the cooling unit only in the cleaned condition after passing through the filter unit, and is finally fed from said cooling unit to the cooling zone in the cleaned condition. It is thereby possible to already prevent contaminated environmental air, which is particularly susceptible to contamination and the formation of germs, from penetrating into the cooling zone.

Unlike what was previously the case in the prior art, therefore, no attempt is made to adopt cleaning measures directly at the particular units (the cooling unit and fan). Instead, adequate filtering of the incoming air prevents these components from being contaminated at all and from being exposed to a formation of germs resulting therefrom. Even if, however, at least temporary contaminants occur at these components—in spite of every care being taken—the invention provides for the possibility of preventing these contaminants from passing over to the goods to be chilled which are to be conveyed, i.e. the food or pharmaceutical products which are being processed, particularly through the fact that these problematical components of the cooling channel—apart from the process air which flows in—are physically encapsulated off and separated from the cooling zone. This measure has proved, in tests, to be extremely effective, because the actual causative agent of contamination, namely condensation water, is kept, according to the invention, out of the cooling channel.

According to one further development of the invention, provision may be made for the cooling unit to have a heat-exchanger which interacts thermodynamically with the environment. In that case, it is possible for the heat-exchanger to be arranged in a heat-exchanger chamber associated with the latter, inside the housing region which is designed in a sealed-off manner. In particular, it is possible for the heat-exchanger chamber to be designed as a separate cell inside the housing region which is designed in a sealed-off manner. In addition to the encapsulation of the cooling unit and fan, it is therefore also possible, according to the invention, to once again arrange the heat-exchanger, in particular, in a separate cell inside the encapsulated housing region. It is precisely in the region of the heat-exchanger that the precipitation of condensation water and the formation of droplets, and consequently contamination or the formation of germs, occur, so that separate encapsulation makes a further contribution to avoiding contamination of the product.

Provision may also be made for a droplet-separator for dehydrating the cooled air to be associated with the heat-exchanger. In this case, it is possible for the droplet-separator to be arranged in the heat-exchanger chamber.

In one variant of embodiment of the invention, the heat-exchanger is fastened to the upper side, in order to guarantee simple installation and disassembly. At the same time, the result is a smooth, easy-to-clean face underneath, and also, with a suitable arrangement, at a distance above, the heat-exchanger.

In order to further facilitate the cleaning and disposal of moisture and condensation water that occurs, provision may also be made, according to the invention, for at least one removable collecting trough to be arranged in the heat-exchanger chamber, underneath the cooling unit, particularly underneath the heat-exchanger or/and the droplet-separator.

In order to minimise the ingress of contaminants and germs into the cooling channel, the invention makes provision, as has already been mentioned initially, for a filter unit, through which the environmental air flows before it enters the cooling unit, to be connected upstream of the cooling unit. In this case, it is possible for the filter unit to be arranged in a filter chamber belonging to the housing region which is designed in a sealed-off manner, which filter chamber is designed so as to be separate in relation to the cooling zone and sealed off therefrom, wherein the filter chamber is in fluidic connection with the cooling unit via a filter lock.

The ingress of contaminated, germ-containing air into the cooling zone can also be further minimised by the fact that at least one irradiation apparatus is associated with the filter unit or/and the heat-exchanger, preferably in the region of the filter lock. Under these circumstances, provision is made, in particular, for the irradiation unit to have at least one UV light source. In this case, advantage may be taken of the fact that the heat-exchanger exerts a certain braking effect on the air flow, so that said air flow is exposed longer to the UV light source, as a result of which the sterilising effect of the latter is reinforced.

In a similar manner to that regarding the heat-exchanger, provision may also be made, as regards the fan, for said fan to be arranged in a fan chamber, which is associated with the latter, inside the housing region which is designed in a sealed-off manner.

In order to increase the efficiency as regards the conveyance of air by the fan, a further development of the invention makes provision for the fan to be arranged so as to be inclined, preferably by an angle $\alpha$ of 10° to 30°, in relation to the plane in which the conveyor belt extends. In this connection, provision may also be made for at least one air-conducting apparatus for orienting the air flow from the fan into the cooling zone to be associated with said fan.

In order to provide better accessibility, particularly for cleaning purposes, provision may be made for the housing to be capable of being opened and closed, by one or more flaps or hoods in each case, in the region of the cooling zone or/and in the housing region, which is designed so as to be separate therefrom and in a sealed-off manner, for receiving the cooling unit and the fan.

It should be mentioned that the entire housing, but particularly the housing in the encapsulated housing region for the cooling unit and fan, is preferably constructed from stainless steel. The stainless steel material is preferably professionally welded in a leak-proof manner, so that silicone seals can be avoided. A further risk of germs being formed in the region of the seals can thereby be reduced.

The invention is distinguished by the fact that those regions in which condensation water occurs are separated from the regions in which the product to be processed is cooled, that is to say, from the cooling zone. The condensation water that occurs, which regularly occurs in the process in the form of "uncontrolled water" and has to be disposed of, can therefore be kept completely remote from these critical regions of the cooling zone, which are to be kept almost germ-free.

The encapsulated housing regions are preferably provided with separate drains, flaps or drip boxes in order to ensure targeted disposal or draining-off of uncontrollable water of this kind. As has been alluded to above, various collecting troughs may be accommodated in the individual housing regions in order to be able to collect, and easily dispose of, moisture that occurs. For this purpose, said collecting troughs may be secured with quick-action fasteners.

In this connection, one advantageous further development of the invention makes provision for the heat-exchanger chamber, the filter chamber and the fan chamber to be constructed with a substantially greater width than the conveyor belt and to jut out beyond said conveyor belt on both sides of the latter, transversely to its direction of conveyance. This guarantees that, even when leakages occur in the region of these chambers and, for instance, contaminated medium, such as condensation water for example, passes out of the said chambers, this medium drips past the conveyor belt and does not reach the region of the cooling zone. Contamination of the goods to be chilled can be effectively prevented by means of this simple design measure.

The air-conducting apparatus mentioned above may also be removable for cleaning purposes.

It may additionally be mentioned that the power supply for the individual driven parts, such as, for instance, pumps, valves, electrical components, fan, etc., may be accommodated in a separate encapsulated unit, for example in a stainless steel housing above or beside the installation.

As regards the geometrical arrangement, the invention has the advantage that the encapsulated region with the cooling unit and fan may optionally be arranged above or underneath the cooling zone, and is physically separated from the latter apart from the region in which the cooled air is conducted into said cooling zone. It is thereby possible, with a compact construction of the cooling channel, to prevent uncontrolled moisture or water from entering the cooling zone. Added to this is the wider construction, which has already been addressed above, of the individual chambers in relation to the cooling zone, particularly in relation to the conveyor belt in the product region. The problems with the prior art that were described initially can thereby be efficiently prevented.

As has been alluded to on a number of occasions above, provision may be made, according to the invention, for the housing and the substructure components to be welded in a leak-proof manner and preferably manufactured from stainless steel. It is also possible, according to the invention, to supply the individual components as modules which can be assembled, and to then weld them in a leak-proof manner, free from joining edges, during erection of the cooling channel, for example by welding individual cooling-table plates and the housing of the cooling tower to one another.

Provision may also be made, according to the invention, for the heat-exchanger chamber, the filter chamber and the fan chamber to be constructed with a substantially greater width than the conveyor belt and to jut out beyond said conveyor belt on both sides of the latter, transversely to its direction of conveyance. As a result of this measure, too, it is possible to prevent contaminated water from penetrating into the cooling zone in the event of a leakage.

Finally, it may be mentioned that the individual components, such as, for instance, the heat-exchanger, droplet-separator and fan, but also the filter and irradiation unit, may be of modular design and be removed separately from the cooling channel for servicing or repair purposes.

The invention will be explained on an exemplary basis below with the aid of the accompanying drawings, in which.

Figures 1, 2:
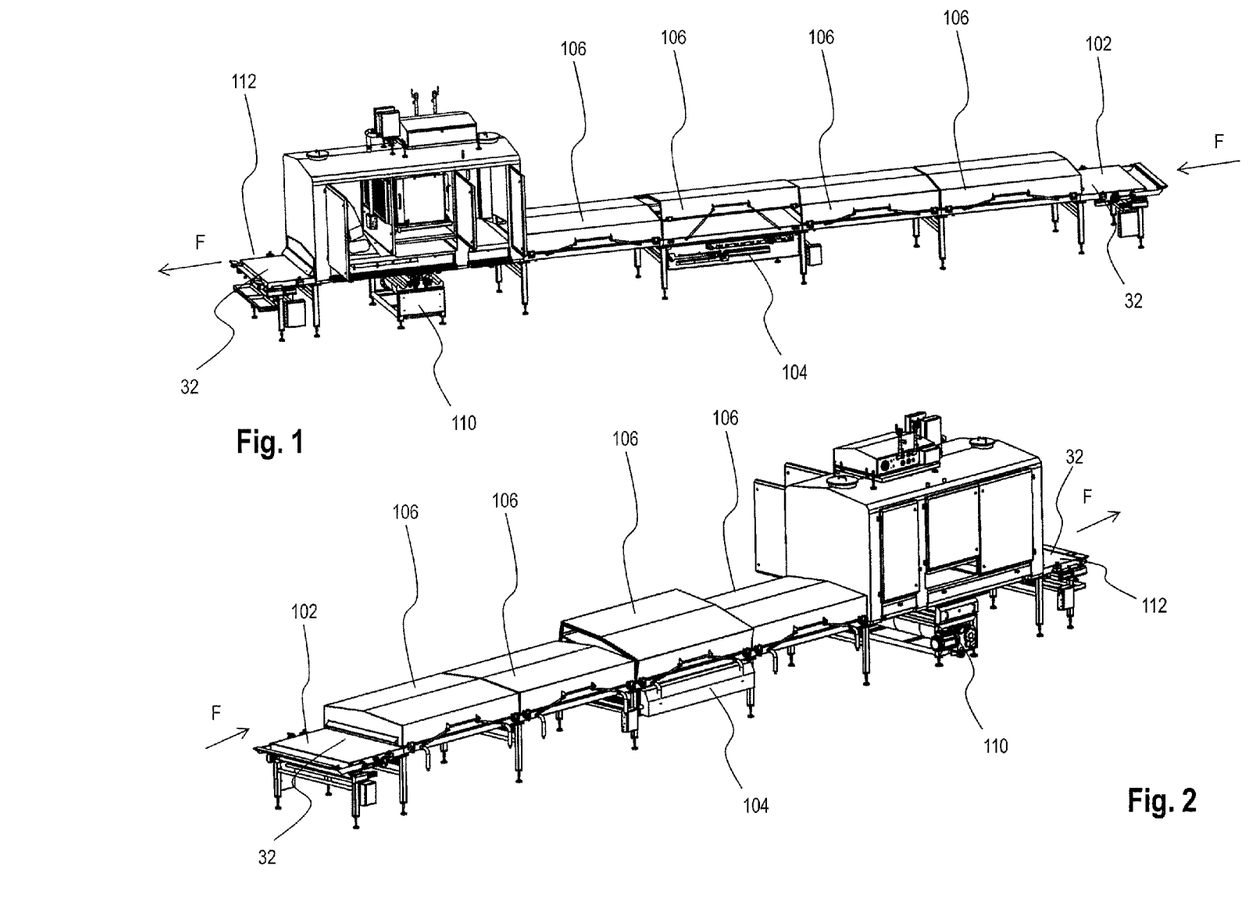
FIG. 1 represents a three-dimensional side view of the cooling channel according to the invention.
FIG. 2 represents another three-dimensional side view of the cooling channel according to the invention.
Figure 3:
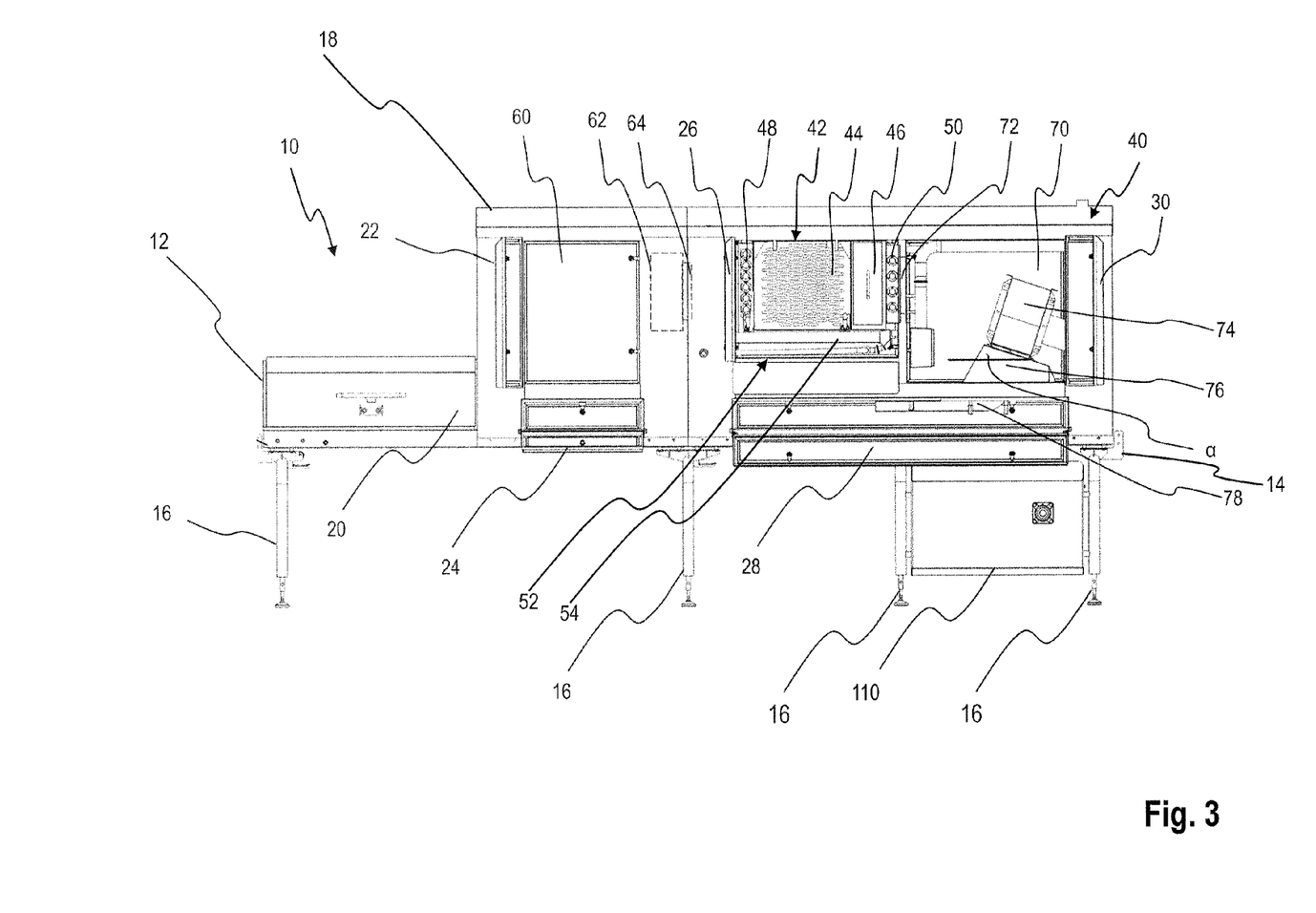
FIG. 3 represents a side view of a detail of the cooling channel according to the invention with a cooling tower with partially open housing regions.

A cooling channel according to the invention is shown in FIGS. 1 and 2 with partially open housing regions, and is designated generally by 100. It comprises an inlet table 102, from which a driven conveyor belt 32 emanates and conveys goods to be chilled in the direction of conveyance F. The conveyor belt 32 runs through under a plurality of four cooling hoods 106 and can be tensioned via a belt-tensioning device 104. One of the cooling hoods 106 is shown in a partially open condition. An essential constituent part of the cooling channel 100 is a cooling tower 10, which will be explained again in detail below. A driving stand 110 is arranged under the cooling tower 10. Adjoining said cooling tower 10 is an outlet table 112.

The cooling channel 100 according to the invention serves to cool goods to be chilled, such as for instance food products, for example confectionery products which have been prefabricated to form chocolate bars, or pharmaceutical products, and to feed these to a packaging station, not shown, at the outlet end 112.

What will be discussed initially below is a variant of embodiment relating to the cooling tower 10, such as may be used in the cooling channel 100, with reference to the representations according to FIGS. 3 to 9. The variant of embodiment of said cooling tower described below differs slightly, in details, from the form of embodiment according to FIGS. 1 and 2.

The cooling tower 10 is arranged on a plurality of feet 16. It is constructed with a housing 18 made of stainless steel which has a number of flaps 22, 24, 26, 28 and 30 which can each be opened and thus offer access to various regions of the cooling tower 10 inside the housing 18. In this connection, it should be emphasized that the flaps 24 and 28 can be opened separately from, and independently of, the flaps 22, 26 and 30. It is thus possible to open the cooling zone, within which a conveyor belt 32 for the goods to be chilled extends, while the regions 60, 52, 70, which may possibly carry germs or be contaminated, remain closed.

The housing 18 is preferably manufactured completely from stainless steel and welded in a leak-proof manner all round. It is free from silicone seals in order to prevent the risk of leakages and the occurrence of bacteria and germ formation. Said housing 18 is also completely thermally insulated.

Figure 4:
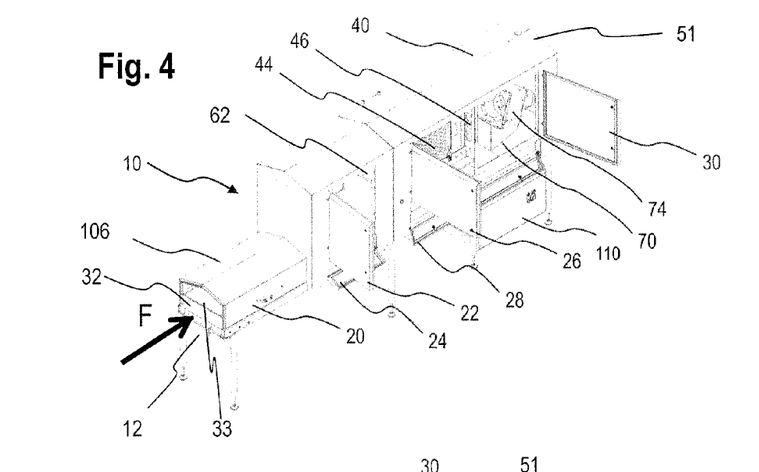
FIG. 4 is a three-dimensional representation of the detail of the cooling channel according to FIG. 3.
Figure 5:
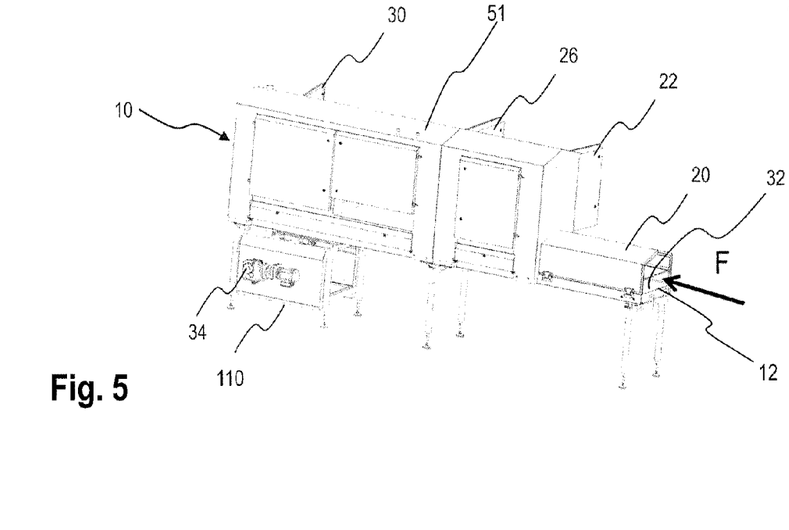
FIG. 5 is a rear view, in a three-dimensional representation, of that detail of the cooling channel which is represented in FIGS. 3 and 4.

Inside the cooling tower 10, there is provided, as is generally known and can be seen particularly in FIGS. 4 and 5, the conveyor belt 32 which can be driven in the direction of conveyance F via a driving apparatus 34. Said driving apparatus 34 is arranged in the separate driving stand 110 underneath the cooling tower 10 and will not be described in any greater detail. A drive for the conveyor belt 32 is accommodated in said driving stand 110. Other components, such as, for instance, circuit technology, voltage supply, etc., for the functional components of the cooling tower which will be described below may be provided in a separate housing. Also visible in FIG. 4 is a return-air duct 33 for feeding back cooling air from the cooling zone to the heat-exchanger.

Inside the housing 18, there is provided, above the conveyor belt 32 and around the latter, a cooling zone, i.e. a hollow space in the housing 18, within which a cooling climate can form in order to cool the goods to be chilled, which are lying on the conveyor belt 32 and are conveyed through the cooling tower 10 via the latter, to the desired extent in accordance with the cooling parameters set, as they pass through said cooling tower 10.

The housing 18 has a tower-like housing region 40 which projects upwards in FIG. 1 and which will be explained in greater detail below. Components which are relevant to the setting of the cooling climate are arranged in the said housing region 40. In particular, this housing region 40 has the door 26 and a cooling unit 42 with a heat-exchanger 44, downstream of which a droplet-separator 46 is connected. The heat-exchanger 44 is attached in a suspended arrangement and is thus accessible, both from above and from below, for cleaning purposes. A hollow space is provided above and below the heat-exchanger 44, in each case, so that the latter can be cleaned even in the installed condition.

It may be mentioned that the heat-exchanger 44 is provided with an additional hot-water connection, so that the entire heat-exchanger unit can be heated up for disinfection purposes, in order to destroy, in the installed condition, any germs it may contain.

A UV irradiation unit 48 is connected upstream of the heat-exchanger 44. There is also connected, downstream of the droplet-separator 46, a second UV irradiation unit 50. The two UV irradiation units 48 and 50, as well as the heat-exchanger 44 and the droplet-separator 46, are arranged in a separate chamber 52 which will be generally referred to below as the "heat-exchanger chamber 52".

Underneath these components, there is arranged in the heat-exchanger chamber 52 a collecting trough 54 which serves to make it possible to catch and dispose of condensation water that occurs within the said chamber 52. The collecting trough 54 is provided with an automatic liquid-emptying system. In addition, it is provided with a locking mechanism which can be manually operated in a simple manner and which can be easily undone so that the collecting trough 54 can be removed from the housing 18, in particular from the chamber 52, for cleaning purposes.

Connected upstream of the heat-exchanger chamber 52 is a filter chamber 60 which is likewise separated off. In the latter, there is arranged a filter 62 through which environmental air passing into the filter chamber must necessarily pass in order to pass through a filter lock 64 arranged between the filter chamber 60 and the heat-exchanger chamber 52. The filter 62 preferably consists of a preliminary filter and a main filter. The filter chamber 60 has a connection (not shown) to the cooling zone and to the return-air duct 33 in order to suck return air out of said return-air duct 33. The filter in question is a particle filter, preferably a fine dust filter of Filter Class F9 according to DIN EN 779, with a high efficiency (>95%).

Connected downstream of the heat-exchanger chamber 52 is a fan chamber 70. Between the heat-exchanger chamber 52 and the fan chamber 70 there is once again arranged an airlock which is designated generally by 72. This airlock 72 comprises an additional heating device 73 which is provided for the purpose of heating up the air passing into the fan chamber 70 by a few degrees, for example by 1-2° C., so that its relative humidity is raised. This makes it possible to effectively suppress the formation of condensate in the cooling zone. Additionally visible is a cable duct 75 which is constructed and routed in a sealed-off manner. A fan 74 is also arranged in the fan chamber 70. Said fan is accommodated on a housing ramp 76 at an oblique orientation with an angle of inclination of about 15°. The housing ramp 76 has an aperture via which air which is cooled by means of the fan is able to flow into the cooling zone which runs through under the fan chamber 70. In order to conduct this air flow into the cooling zone in a directed manner, an air-guiding duct 78 made of air-conducting metal sheet is provided.

As can be seen, particularly in FIGS. 3 to 7, the filter chamber 60, the heat-exchanger chamber 52, the fan chamber 70 and the product region lying beneath them are completely separated from one another and are designed so as to be separately accessible via associated flaps or doors in each case. What can thereby be achieved is that no unwanted exchange of media takes place between the individual chambers, except via the intended connections.

Figure 6:
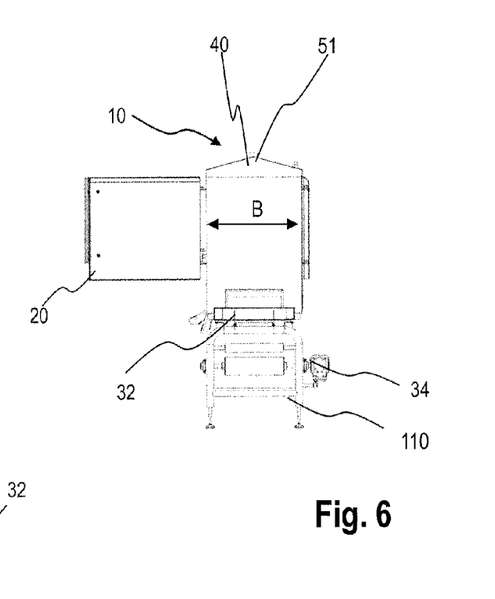
FIG. 6 represents a side view from the right of that detail of the cooling channel which is represented in FIG. 3, with the housing region open.

As can be seen, particularly in FIGS. 4 to 6, the cooling tower 10 has a greater width B than the product region with the conveyor belt 32. This guarantees that, even if a leakage occurs, for instance in the heat-exchanger chamber 52, which allows condensation water or cooling medium to pass out of said heat-exchanger chamber 52, the said medium does not reach the region of the conveyor belt 32 but, so to speak, flows past or drips past the latter at the side. By means of the arrangement according to the invention, it is possible, because of the arrangement of the individual components in chambers which are separated from one another, to effectively avoid contamination of the goods to be chilled which are to be cooled.

In detail, the cooling tower 10 according to the invention is also distinguished by the fact that it has a "pointed" roof geometry 51 which facilitates cleaning, promotes the flowing-away of liquids and avoids the formation of pools. All the electrics and pneumatics are arranged, inside and outside the tower 10, in hygienic terminal boxes and can thus be easily serviced. In addition, they are thereby less heavily exposed to individual media and temperature fluctuations. The routing of cables takes place from inside towards the outside and inside the cooling tower in stainless steel pipes that are welded in a leak-proof manner and in sealed-off screwed cable connections, as shown, for instance, at 75 in FIG. 8, in order to also counteract leakages and contamination in this way.

Figure 10:
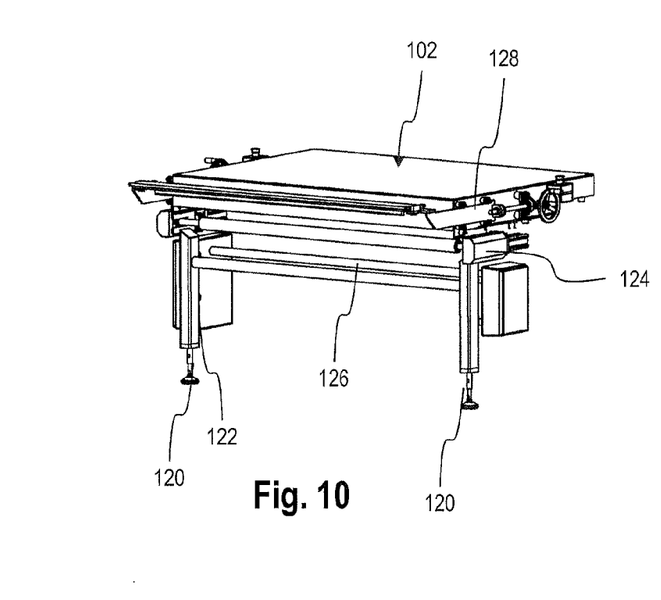
FIG. 10 is a representation of an inlet table for the cooling channel according to the invention.

In addition to the cooling tower 10, the cooling channel 100 has the following components, whose characteristic design properties will be briefly explained:

The inlet table 102, which is shown three-dimensionally in the detail in FIG. 10, stands on two feet 120. It has a frame 122 which is welded in a completely leak-proof manner so that no media are able to penetrate. It is provided with an externally located belt-control system 124. Also shown is a tubular cable guide 126 which is likewise closed in a leak-proof manner. There can finally be seen a device 128 for adjusting the re-routing profile for the conveyor belt (not shown). This device, too, is arranged in an externally located manner and is thus easy to clean.

Figure 11:
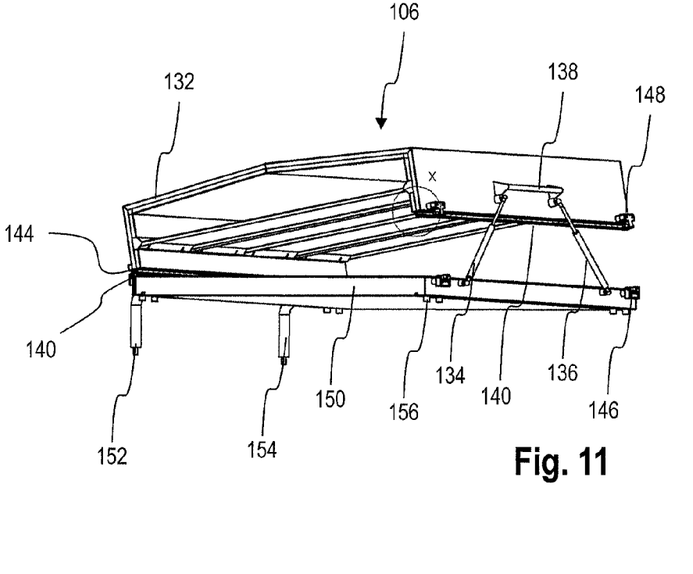
FIG. 11 is a representation of a cooling-channel hood for the cooling channel according to the invention.
Figure 12:
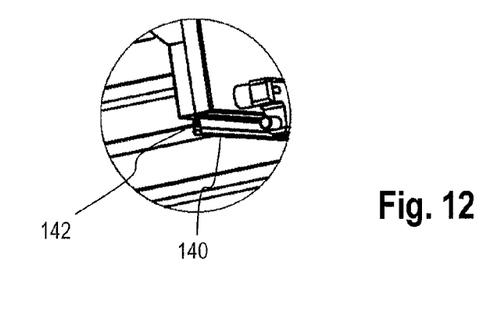
FIG. 12 is a detail representation relating to that region of the picture which is identified in FIG. 11.

The cooling-channel hood 106 has a stainless steel hood 132 which is constructed in the shape of a roof in order to facilitate the flowing-off of media and also cleaning, and in order to avoid the formation of pools. For thermal insulation purposes, it is completely filled with foam. It can also be seen that two gas-pressure springs 134, 136 are arranged in an externally located manner and at a sufficient distance from the interior space. This guarantees that the interior space and the goods to be chilled conveyed therein will not be contaminated, even if a leakage—for instance of lubricant or gas—occurs at the gas-pressure springs. For opening purposes, a stainless steel handle 138 is provided, which is likewise completely welded on and thus requires no additional fastening means which carry dirt. In the longitudinal direction there is provided, in each case, an easy-to-clean seal 140 which is received via a sealing edge 142 which is welded in a leak-proof manner. Even the hinges 144 on the side that faces away from the gas-pressure springs 134, 136 are arranged at a sufficient distance from the interior space and are welded in a leak-proof manner, without additional fastening means being required. Finally, there can be seen front hinges 146, 148 which are likewise arranged at a distance from the interior space. The hinges 144, 146, 148 allow opening of the cooling-channel hood 106 from the left or right, according to choice. Also provided under the stainless steel hood 132 is a cooling-table plate 150 which is designed so as to be welded in a leak-proof manner. This, too, is completely foam-filled and provided with a water, brine or Freon cooling system. Said cooling system is supplied with coolant via connections 152, 154 constructed in stainless steel. These connections 154, 156 are completely insulated and welded in a leak-proof manner. Fastening tabs 156 are also arranged, and welded in a leak-proof manner, on the underside of the cooling-table plate 150, in order to provide for the attachment of suitable feet at a distance from said cooling-table plate 150.

Figures 13, 14, 15:
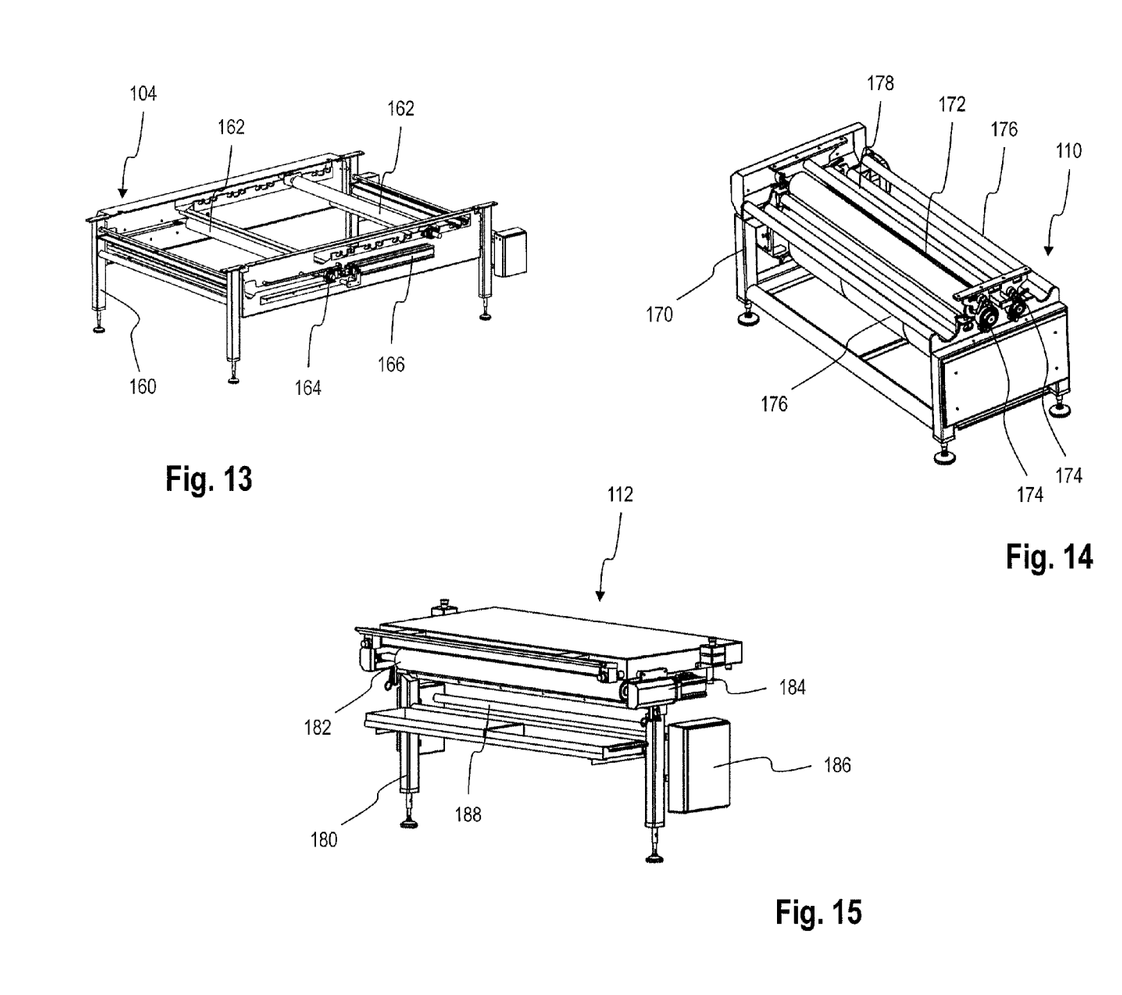
FIG. 13 is a representation of a device for setting the belt tension for the cooling channel according to the invention.
FIG. 14 is a representation of a driving stand for the cooling channel according to the invention.
FIG. 15 is a representation of an outlet table for the cooling channel according to the invention.

FIG. 13 shows the device 104 for tensioning the belt. This, too, has a base frame 160 which is welded in a completely leak-proof manner. In addition, roller bodies 162 are welded in a leak-proof manner. Said roller bodies 162 are mounted on the frame 160 in a region 164 which is arranged outside, and at a sufficient distance from, the region of the conveyor belt. Finally, it can be seen that pneumatic cylinders 166 which are also provided for adjusting the tensioned condition of the conveyor belt (and of which only one is shown) are arranged in an externally located manner. It is therefore likewise not possible for any contamination to emanate from these pneumatic cylinders 166 in the region of the cooling zone.

FIG. 14 shows the driving stand 110. Its basic frame 170, too, is welded in a completely leak-proof manner. In the same way, all the roller bodies 172 and spindles of all the rollers 172 are welded in a leak-proof manner. Once again, the mounting arrangement 174 of the rollers 172 is arranged in an externally located manner. There can also be seen depositing rails 176 which make it possible to easily disassemble the rerouting rollers 172 and deposit them in said rails. By this means, too, contamination and dirtying of the rollers 172 can be prevented. Finally, there can be seen strippers 178 which can be disassembled easily and without major outlay, particularly without any additional tool.

FIG. 15 shows the outlet table 112. Its frame 180, too, is welded in a completely leak-proof manner. In the same way, the control roller 182, which has a roller body with spindles, is welded in a leak-proof manner. In the case of the outlet table, too, a belt-control system 184 is provided, which is arranged in an externally located manner in the same way as in the inlet table 102. Finally, there can be seen hygienic terminal boxes 186 for the electrics and pneumatics, which are connected via cable guides 188 which are closed and welded in a leak-proof manner.

All the components are distinguished by the fact that they are welded in a leak-proof manner all round and therefore offer no possibility for media to collect, or contamination or germs to form, within them. No joining edges which have to be sealed off, for instance, by silicone seals, are provided.

Method of Operation:

During operation, goods to be chilled are placed on the conveyor belt 32 at the inlet end of the cooling channel 100 in the region of the inlet table 102, and are first of all transported, by means of said conveyor belt 32, through the cooling-channel hood 106 which can be hinged upwards. Prevailing in said hood is a cooling climate which emanates from the precautionary cooling measures at the cooling tables and the cooling tower 10 which is connected downstream thereof.

Adjacent to the region under the cooling-channel hood 106, the goods to be chilled are conveyed through the cooling zone provided in the interior of the cooling tower 10. The cooling unit is operated for the purpose of cooling the goods to be chilled in the said cooling zone. This unit accordingly sucks air from the cooling zone into the filter chamber 60 via the fan 74. This air which is sucked into said filter chamber 60 is sucked, via the fan 74, out of the filter chamber 60 through the filter unit 62, where the air is cleaned. This guarantees that the air sucked in, which may optionally also contain at least a small fraction of environmental air, is adequately filtered and therefore only clean air reaches the heat-exchanger chamber 52.

After flowing through the filter unit 62, the air flows through the UV irradiation unit 48, where germs are destroyed by UV radiation. The air then flows through the heat-exchanger 44, in which it is cooled down. The cooled air is dehumidified in the droplet-separator 46 or/and in the heat-exchanger 44. The condensation water that is precipitated in the heat-exchanger 44 and droplet-separator 46 is collected in the collecting trough 54.

After leaving the droplet-separator 46, the cooled and dehumidified air flows through the other UV irradiation unit 50, again in order to destroy germs. In this connection, it should be noted that the heat-exchanger 44 exerts a certain braking effect on the air flow, which leads to said air flow being exposed to the two UV irradiation units 48 and 50 over a longer period of time. This increases the germ-destroying effect which is achieved by way of the UV irradiation. Finally, the air flows from the UV irradiation unit 50 into the fan chamber 70, from which point it is conducted, by means of the fan 74, into the cooling zone via the air-conducting duct 78.

By guiding the air in this way, it is therefore possible to achieve a strict separation between the adequately filtered and clean air which comes into contact with the product, and the environmental air. In particular, it is thereby possible to prevent contaminated air from reaching the heat-exchanging chamber, where it might otherwise be possible for germs to form in the event of the penetration of contaminated air. The oblique position of the fan 74 brings with it the advantage of an improved flow against the goods to be chilled.

The invention is distinguished by the fact that those regions in which polluted air and condensation water occur, in particular the filter chamber 60, the heat-exchanger chamber 52 and the fan chamber 70, are separated from the regions in which the product to be processed is cooled, that is to say from the cooling zone. The condensation water that occurs, which normally occurs in the form of "uncontrolled water" in the cooling process and has to be disposed of, can therefore be entirely separated from these critical regions of the cooling zone which are to be kept almost germ-free.

The encapsulated housing regions 60, 52, 70 are provided with separate drains or flaps in order to ensure targeted disposal or draining-off of uncontrollable water of this kind. For this purpose, for example, the collecting trough 54 is accommodated in the housing region 52 in order to be able to catch, and easily dispose of, moisture that occurs.

The air-conducting apparatus 78 mentioned above may also be removable for cleaning purposes.

What is achieved by means of the filter arrangement is that only cleaned air is fed to the heat-exchanger, which is particularly susceptible to contamination and the formation of germs in conventional devices. This means that it is precisely the feeding of environmental air which has foam to the heat-exchanger which is prevented.

In addition, it may be mentioned that the driving unit for the conveyor belt 32 is arranged in the housing region 110 underneath said conveyor belt. Other components for supplying power to the individual driven parts, such as, for instance, pumps, valves, electrical components, fan, etc., are accommodated outside the encapsulated housing regions 60, 52 and 70, preferably in a combined unit which is likewise encapsulated in a housing.

As regards the geometrical arrangement, the invention has the advantage that the encapsulated region 40 with the cooling unit 42 and fan 74 in the form of embodiment shown can be arranged above the cooling zone and is physically separate therefrom with the exception of the region 78 in which the cooled air is conducted into said cooling zone. It is thereby possible, with a compact construction of the cooling tower 10, to prevent uncontrolled moisture or water from entering the cooling zone.

Finally, it may be mentioned that the individual components: the heat-exchanger 44, droplet-separator 46, fan 74, filter unit 62 and irradiation units 48, 50, are of modular design and can be removed from the cooling tower for servicing or repair purposes.

Figures 7, 8, 9:
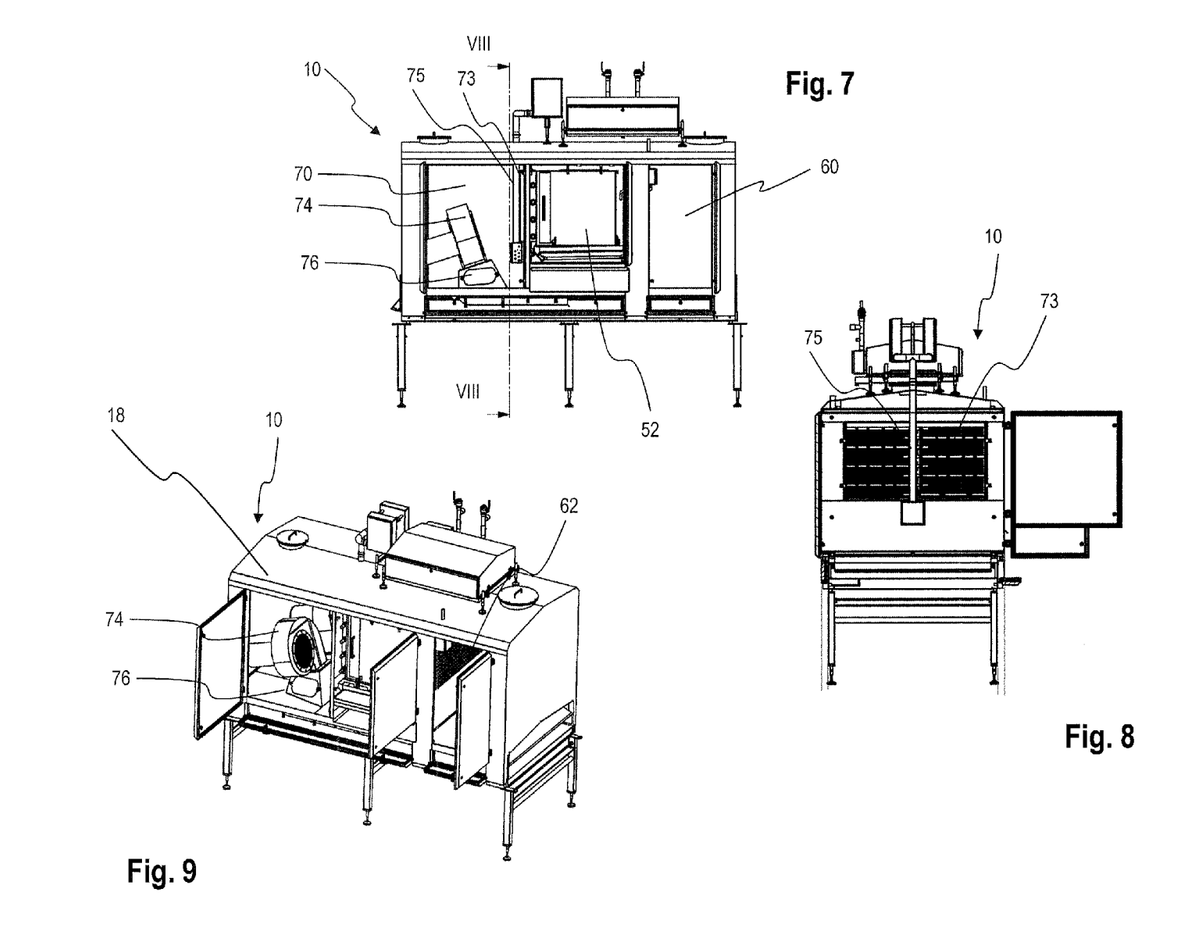
FIG. 7 represents another side view of the cooling tower with housing regions open, in a slightly modified form of embodiment.
FIG. 8 represents a sectional view along the sectional line VIII-VIII from FIG. 7.
FIG. 9 represents a three-dimensional view of the cooling tower in the open condition according to FIG. 7.

FIGS. 7 to 9 show a cooling tower 10 which is of substantially the same design as the cooling tower according to FIGS. 4 to 6, but in which this cooling zone also has, on its roof, control components as well as supply components for pneumatics. Otherwise, the components shown and the construction in the interior correspond to those which have been described above.

The invention claimed is:

1. Cooling channel for cooling goods to be chilled, including food or pharmaceutical products, comprising a cooling tower having:
   an inlet end and an outlet end;
   a driven conveyor belt, on which the goods to be chilled are arranged and are conveyed through the cooling tower from the inlet end to the outlet end;
   a housing, which surrounds the conveyor belt and forms a cooling zone in a region of said conveyor belt;
   a filter unit for filtering air;
   a cooling unit for cooling the cooling zone; and
   at least one fan, which interacts thermodynamically with the cooling unit and which is designed to convey cooled air from the cooling unit to the cooling zone; and
   wherein the cooling unit and the fan are arranged in an encapsulated housing region which is separated and sealed from the cooling zone, wherein only a fluid connection is provided for conveying the cooled air between the fan and the cooling zone, wherein the filter unit is arranged in front of the cooling unit with respect to the air flow in order to feed only filtered air to said cooling unit, wherein the cooling unit has a heat-exchanger which interacts thermodynamically with the environment, wherein the heat-exchanger is arranged in a heat-exchanger chamber associated with the heat-exchanger, inside the encapsulated housing region which is designed in a sealed-off manner, and wherein the filter unit is arranged in a filter chamber belonging to the encapsulated housing region which is designed in a sealed-off manner, which filter chamber is designed so as to be separated and sealed from the cooling zone, wherein said filter chamber is in fluidic connection with the cooling unit via a filter lock.

2. Cooling channel according to claim 1, wherein the heat-exchanger chamber is designed as a separate cell inside the encapsulated housing region which is designed in the sealed-off manner.

3. Cooling channel according to claim 1, wherein a drip-separator is associated with the heat-exchanger.

4. Cooling channel according to claim 3, wherein the drip-separator is arranged in the heat-exchanger chamber.

5. Cooling channel according to claim 1, wherein at least one removable collecting trough is arranged in the heat-exchanger chamber, underneath the cooling unit.

6. Cooling channel according to claim 1, wherein an irradiation apparatus is associated with at least one of the filter unit and the heat-exchanger.

7. Cooling channel according to claim 6, wherein the irradiation apparatus has at least one UV light source.

8. Cooling channel according to claim 1, wherein the fan is arranged in a fan chamber, which is associated with the fan, inside the encapsulated housing region which is designed in a sealed-off manner.

9. Cooling channel according to claim 1, wherein the fan is arranged so as to be inclined in relation to a plane in which the conveyor belt extends.

10. Cooling channel according to claim 1, wherein at least one air-conducting apparatus for orienting the air flow from the fan into the cooling zone is associated with said fan.

11. Cooling channel according to claim 1, wherein the housing is capable of being opened and closed, by one or more flaps or hoods in each case, in at least one of a region of the cooling zone and the encapsulated housing region, which is designed so as to be separated and sealed from the cooling zone, for receiving the cooling unit and the fan.

12. Cooling channel according to claim 1, wherein the housing of the cooling tower and substructure components of the cooling channel are, in each case, welded in a sealed manner and manufactured from stainless steel.

13. Cooling channel for cooling goods to be chilled, including food or pharmaceutical products, comprising a cooling tower having,
   an inlet end and an outlet end;
   a driven conveyor belt, on which the goods to be chilled are arranged and are conveyed through the cooling tower from the inlet end to the outlet end;
   a housing, which surrounds the conveyor belt and forms a cooling zone in a region of said conveyor belt;
   a filter unit for filtering air;
   a cooling unit for cooling the cooling zone; and
   at least one fan, which interacts thermodynamically with the cooling unit and which is designed to convey cooled air from the cooling unit to the cooling zone; and
   wherein the cooling unit and the fan are arranged in a housing region which is separated and sealed from the cooling zone, wherein only a fluid connection is provided for conveying the cooled air between the fan and the cooling zone, wherein the filter unit is arranged in front of the cooling unit with respect to the air flow in order to feed only filtered air to said cooling unit, wherein the cooling unit has a heat-exchanger which interacts thermodynamically with the environment, and wherein the heat-exchanger is arranged in a heat-exchanger chamber associated with the heat-exchanger, inside the housing region which is designed in a sealed-off manner, wherein the filter unit is arranged in a filter chamber belonging to the housing region which is designed in a sealed-off manner, which filter chamber is designed so as to be separated and sealed from the cooling zone, wherein said filter chamber is in fluidic connection with the cooling unit via a filter lock, wherein the fan is arranged in a fan chamber, which is associated with the fan, inside the housing region which is designed in a sealed-off manner and wherein the heat-exchanger chamber, the filter chamber and the fan chamber are constructed with a substantially greater width than the conveyor belt and jut out beyond said conveyor belt on both sides of the conveyor belt, transversely to direction of conveyance of the conveyor belt.

* * * * *